United States Patent [19]

Radtke

[11] 4,336,078

[45] Jun. 22, 1982

[54] PROCESS AND APPARATUS FOR THE SEPARATION OF METALLURGICAL PRODUCTS

[75] Inventor: Waldemar Radtke, Oberhausen, Fed. Rep. of Germany

[73] Assignee: Thyssen Aktiengesellschaft, Duisburg, Fed. Rep. of Germany

[21] Appl. No.: 139,342

[22] Filed: Apr. 11, 1980

[30] Foreign Application Priority Data

Apr. 11, 1979 [DE] Fed. Rep. of Germany ....... 2914628

[51] Int. Cl.$^3$ ................................................ B23K 7/08
[52] U.S. Cl. ...................................... 148/9 R; 266/49; 266/50; 266/902
[58] Field of Search ........................... 266/48, 49, 902; 149/9 R, 9.6

[56] References Cited

FOREIGN PATENT DOCUMENTS 2839515 2/1980 Fed. Rep. of Germany ........ 266/49

Primary Examiner—W. Stallard
Attorney, Agent, or Firm—Kenyon & Kenyon

[57] ABSTRACT

A process and apparatus for separating metallurgical products such as ingots, slabs or plate-shaped workpieces using a cutting torch disposed on one side of the product which follows a prescribed cutting line and which forms a front cutting edge on the surface of the product facing the torch and a rear cutting edge on the opposite side of the product and a cutting joint therebetween. At least one gaseous jet is directed at the rear cutting edge of the product to blow molten metal and liquid slag formed during cutting away from the rear cutting edge, thereby preventing the formation of flame burrs at the edges of the cutting joint.

23 Claims, 5 Drawing Figures

PROCESS AND APPARATUS FOR THE SEPARATION OF METALLURGICAL PRODUCTS

BACKGROUND OF THE INVENTION

1. Field of the Invention

The present invention relates to a process for the separation of metallurgical products such as, for example, ingots, slabs or plate-shaped workpieces, and in particular for the transverse division of the cast strand in continuous casting plants and for the longitudinal division of continuous cast ingots which have previously been cut into lengths, in which the products are divided using one or several oxyacetylene or plasma cutting torches disposed on one side of the products and by following a prescribed cutting line and in which a front cutting edge is formed on the surface of the products facing the cutting torches and a rear cutting edge is formed on the other side of the products. The invention further relates to an apparatus for carrying out the process.

2. Description of the Prior Art

The foregoing type processes are used, among other places, in cases where ingots, billets or slabs, or also metallic plate-shaped workpieces of lesser thickness, are to be cut to predetermined lengths and/or widths. Thus, such processes are used, for example, in the transverse division of a strand divided while still hot into single continuous cast ingots directly after the last pinch rolls of the casting plant have been passed. In practice, such processes are also used to longitudinally divide hot cast ingots which have previously been cut into lengths directly and without delay, or to divide such ingots longitudinally only after the ingots have been discharged and have cooled.

In such processes, separation is usually carried out using at least one oxyacetylene cutting torch. It is also known to use two oxyacetylene cutting torches for each cutting point in order to increase cutting speed. Attempts have also recently been made to use plasma cutting torches in such processes. The purpose of such processes is to obtain a satisfactory quality in the surface and edges of the cutting joints, and in particular to produce surfaces and edges which do not need any finishing.

In a process of this type described in German Offenlegungsschrift No. 27 18 748, separation is carried out using a cutting torch which is disposed above the product being cut and is supported on a carrier bracket. The product is preferably disposed horizontally on a base and the axis of the cutting torch is disposed so that the cutting jet is directed downwardly from the cutting torch. At the beginning of the cutting process, the cutting torch is moved with the aid of the carrier bracket to the edge of the product from which cutting is to start. When preheating has been achieved, the operation is switched over to cutting. At the same time, the forward movement of the movable carrier bracket, or in the case of transverse division in continuous casting plants, the forward movement of the movable torch, is switched to the carrier bracket which is fixed in relation to the product, and the torch follows a predetermined cutting line towards the opposite edge of the product. The time necessary to achieve separation can be reduced by using two individual cutting torches which move towards one another from opposing edges of the product. To reduce cutting time, it has also been suggested to use two oxyacetylene cutting torches disposed one behind the other in the cutting direction which are adjustable independently of one another and form a common cutting joint in the product to carry out the cutting. In either case, i.e., where only one cutting torch is used or two cutting torches are used, a cutting surface is formed at the cutting point.

The term "cutting surface" as used herein means the reaction surface of the cutting process on which the cutting jet of the cutting torch or torches melts and removes the material during the cutting process. The cutting surface has, as viewed in the flow direction of the cutting jet or jets, a front cutting edge on the surface of the product facing the cutting torch or torches and a rear cutting edge on the opposite side of the product, the cutting edges being located above and below, respectively, in the case of horizontal products lying on a base. The rear or lower cutting edge thereby passes at its two ends into one of the two rear or lower edges of the finished cutting joint.

Known torch cutting processes using either one or two cutting torches per cutting point have the disadvantage that thick beads of a solidified metal-slag mixture, so-called "flame burrs", are formed at the edges of the cutting joint on the underside of the product. These "flame burrs" are composed of a portion of the metal of the cutting joint which is melted by the cutting torches, partially burnt and pulled downwardly by the cutting jet of the cutting torch or torches. A certain amount of the metal-slag mixture falls off the ingot in droplets, while the other part solidifies on the edges of the finished cutting joint, sometimes forming beads several centimeters thick. Practice has now shown that billets and ingots with such "flame burrs" can not be hot rolled in this condition directly following the separation process and it is necessary to remove the "flame burrs" beforehand, e.g., by grinding, planing or by flame descaling. In many cases an expensive turn-over device is necessry in addition to this removal operation.

In order to eliminate these disadvantages, German Offenlegungsschrift No. 27 18 748 teaches that the torch should be moved beneath the product with the cutting jet directed upwardly. According to this publication, no "flame burrs" are formed in such a process and the material ejected out of the cutting joint which drops onto the surface of the product supposedly does not affect subsequent rolling of the product and does not need to be removed. However, in actual fact, deposits are also formed on the upper edges of the cutting joint in this process and the surfaces obtained on the cutting joint are not clean and even. A further disadvantage of this process is that undesirable contamination is caused by the large amount of smoke formed and the ejected material sprayed over a wide area around the cutting point. Such contamination must be prevented by using specially-designed apparatus.

German Pat. No. 12 12 393 describes a process in which a pressurized water jet is directed obliquely from beneath the product onto the slag issuing from the cutting joint during torch cutting in vertical continuous casting plants in order to prevent a slag "burr" from forming. This method, however, has proven to be impractical since it requires a high water consumption and an additional water cleaning unit.

SUMMARY OF THE INVENTION

It is therefore an object of the present invention to overcome the aforementioned disadvantages of heretofore known processes and to provide an improved process and apparatus for the separation of metallurgical products which effectively prevent the formation of "flame burrs" at the edges of the cutting joint during separation of the products without incurring the large installation expenses presently required in known processes.

These and other objects of the invention are achieved in a process for separating metallurgical products, such as ingots, slabs or plate-shaped workpieces, and in particular for transversely dividing the cast strand in continuous casting plants and for longitudinally dividing continuous cast ingots which have previously been cut into lengths, in which the metallurgical products are divided using at least one cutting torch which forms a cutting jet disposed on one side of the product and by following a prescribed cutting line, and in which a front cutting edge is formed on the surface of the product facing the cutting torch, a rear cutting edge is formed on the opposite side of the product, and a cutting joint is formed therebetween. The improvement comprises directing at least one gaseous jet at the rear cutting edge of the product, whereby a mixture of molten metal and liquid slag formed during cutting of the product is blown away from the rear cutting edge of the product, thereby preventing the formation of flame burrs at the edges of the cutting joint.

The foregoing objects are also achieved in an apparatus for separating such metallurgical products including at least one cutting torch which forms a cutting jet disposed on one side of said products for dividing the product by following a prescribed cutting line, and which forms a front cutting edge on the surface of the product facing the cutting torch during cutting, a rear cutting edge on the opposite side of the product and a cutting joint therebetween. The improvement comprises at least one gas jet nozzle means, coupled to the cutting torch and directed at the rear cutting edge of the product, for blowing molten metal and liquid slag formed during cutting of the product away from the rear cutting edge of the product, thereby preventing the formation of flame burrs at the edges of the cutting joint. The so-called "flame burrs" are formed by material dripping at the rear cutting edge and solidifying at the two rear edges of the cutting joint. Such solidifying is prevented in accordance with the invention by directing at least one cold gaseous jet at the rear cutting edge of the products. The gaseous jet used in the invention is provided in addition to the cutting torch or torches. At least two gaseous jets which are symmetrically disposed with respect to the cutting joint are preferably directed at the rear cutting edge. This is particularly advantageous and permits the gaseous jets to be directed onto areas of the rear cutting edge which pass into the edges of the cutting joint. In this way, the areas in which "flame burrs" generally form are swept by the gaseous jets. When the improved process of the invention is used, the mixture of molten metal and liquid slag is blown away from the rear cutting edge so that the otherwise usual "flame burrs" are prevented from forming.

According to a further advantageous embodiment of the invention, the rear cutting edge is preferably blown in a direction towards the advancing cutting joint, whereby "flame burrs" are prevented from adhering. The gaseous jets are preferably directed at the rear cutting edge at an angle between about 0° and about ±30°, preferably about 0° to about ±15°, with respect to the tangent plane of the product in the area of the rear cutting edge. The gaseous jets may be a weaker air or oxygen jet in comparison with the cutting jet of the cutting torches. If an oxygen jet is utilized which is weaker in relation to an air jet, then not only is the metal-slag mixture blown away from the rear cutting edge, but it is additionally burnt. Even if a residual amount of the mixture should adhere to the rear cutting edge, it is burnt off in this case by the oxygen jet.

The intensity and direction of the gaseous jets are preferably adjustable independently of the cutting jet of the cutting torches, and independently of one another. This ensures that the metal-slag mixture is blown away from the rear cutting edge when the mixture, which is not distributed evenly over the length of the rear cutting edge, drips from the edge. The process of the invention enables the products to be cut in hot and in cold states.

These and other novel features and advantages of the invention will be described in greater detail in the following detailed description.

BRIEF DESCRIPTION OF THE DRAWINGS

In the drawings, wherein similar reference numerals denote similar elements throughout the several views thereof.

DETAILED DESCRIPTION

Figure 1:
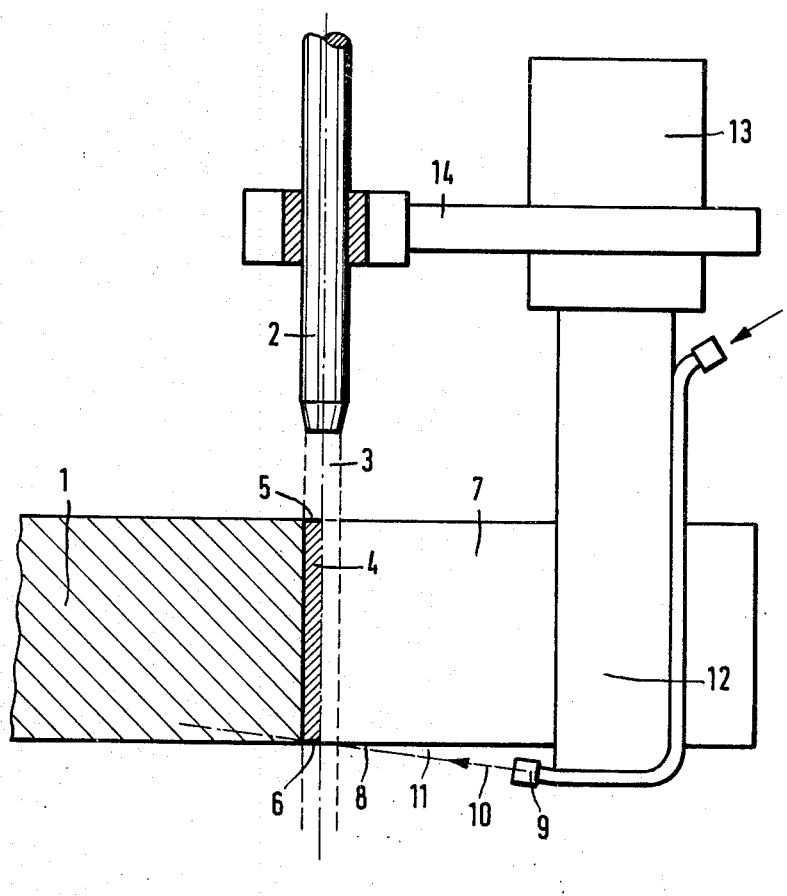
FIG. 1 is a schematic illustration of an improved apparatus for separating metallurgical products constructed according to the present invention.
Figure 2:
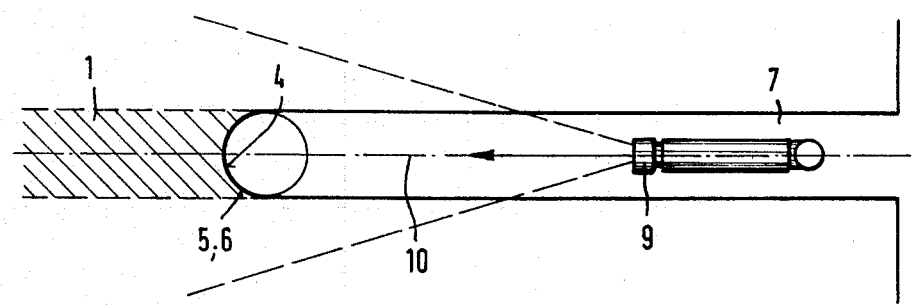
FIG. 2 is a cross-sectional view of the apparatus, showing the operation of the gas jet nozzle.
Figure 3:
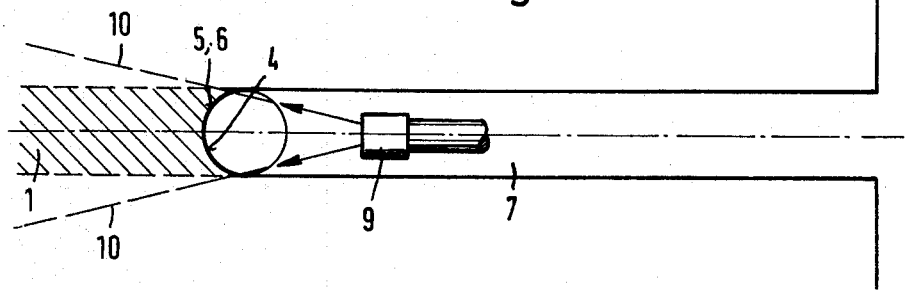
FIG. 3 is a cross-sectional view of another embodiment of the apparatus which utilizes a double gas jet nozzle.
Figure 4:
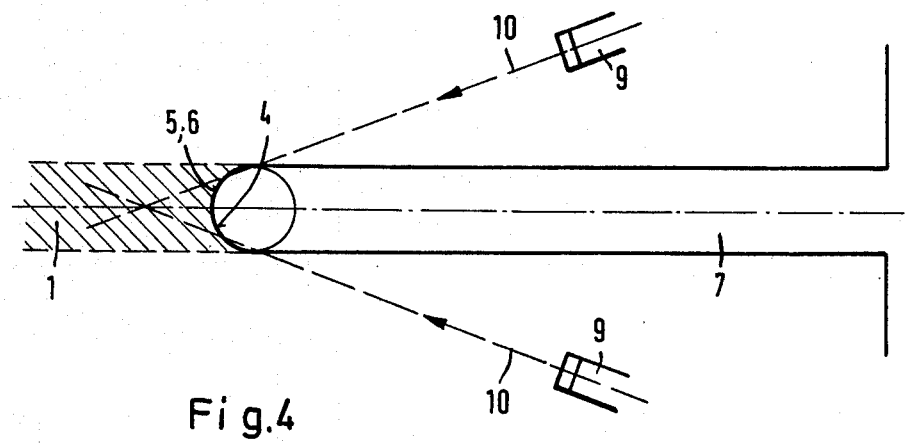
FIG. 4 is a cross-sectional view of still another embodiment of the apparatus which uses a pair of gas jet nozzles.

Referring now to the drawings, there is shown a cutting torch 2, the cutting jet 3 of which produces a continuous cutting surface 4 having an upper (or front) and a lower (or rear) cutting edge, 5 and 6 respectively, and forms a cutting joint 7. The torch 2 is disposed above the product 1 which is to be cut or separated. In the illustrated embodiment of the invention, the product is disposed horizontally on a base (not shown). In order to avoid the formation of "flame burrs" on the lower edges 8 of the finished cutting joint 7, a gas jet nozzle 9 is disposed so that the gaseous jets 10 issuing from it are directed, as shown in FIG. 1, at the lower cutting edge 6 at an acute angle 11 with respect to the surface of the product in the area of the lower cutting edge 6. Alternatively, the gaseous jets 10 can be directed parallel or obliquely downwardly onto the lower cutting edge 6 at an acute angle with respect to the surface of the product. If only one gas jet nozzle 9 is used, it is preferably disposed in the cutting joint 7, as shown in FIGS. 2 and 3. If two gas jet nozzles 9 are used, as shown in FIG. 4, they are disposed beneath the product 1. If the gas jet nozzle 9 is disposed in the cutting joint 7, it may comprise a double gas jet nozzle as shown in FIG. 3.

In order to provide joint movability of the cutting torch 2 and the gas jet nozzles 9, the torch and nozzles are mechanically connected to one another by a spacer element 14 and a sword member 12. In order to adjust and lift the gas jet nozzles 9 out of the position inside or below the cutting joint 7, the sword member 12 is designed so that it can be lifted, lowered and also swung away by means of an adjusting device 13. It should be noted that an apparatus constructed according to the present invention is operable not only in the arrangement shown in FIG. 1, but in other arrangements as well. The illustrated arrangement with the cutting torches 2 located above the product 1, however, improves the downward discharge of the material which has melted on the cutting surface 4 and drips onto the lower cutting edge 6.

Figure 5:
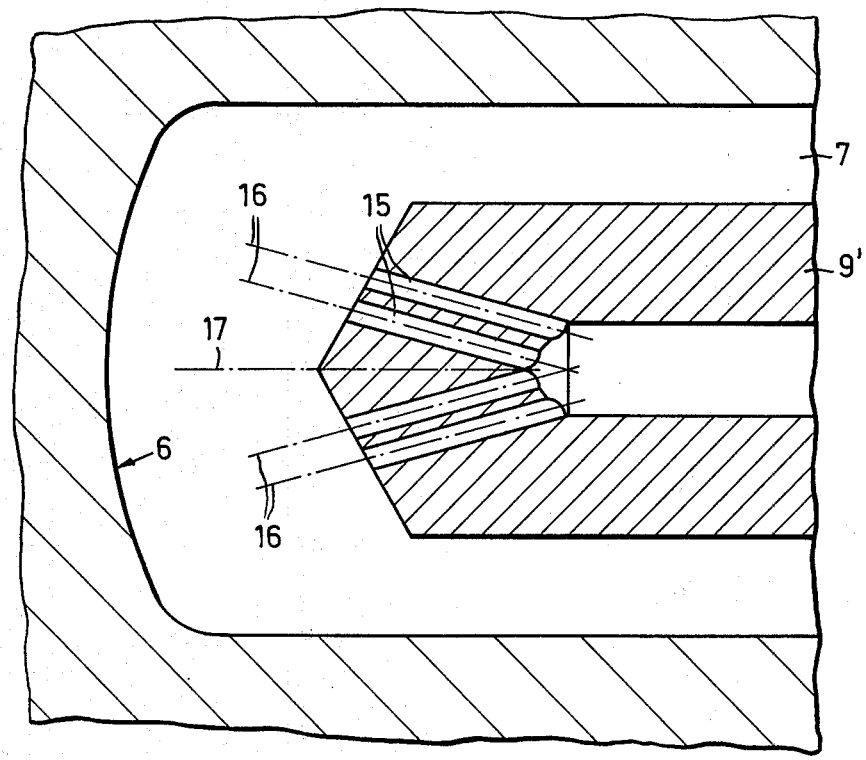
FIG. 5 illustrates one embodiment of a nozzle for use in the apparatus.

A four-hole nozzle 9' is illustrated in FIG. 5 and is disposed in the cutting joint 7 in front of the rear cutting edge 6. The nozzle has two groups of bores each with two parallel bores 15 which are disposed at an angle of between about 10° and about 20° with respect to the center axis 17 of nozzle 9'. The axes 16 of the two groups of bores 15 form an angle of between about 20° and about 40°. All the axes 16 of the bores 15 lie in the same plane. Gas flows through the bores 15 out of the inside of the nozzle 9' onto the rear cutting edge 6 and the transition area between this and the longitudinal edges of the cutting joint 7. This distance between the outlet openings of the bores 15 of the nozzle 9' and the rear cutting edge 6 depends on various parameters, in particular on the width of the cutting joint 7 and the angle setting of the bore axes 16 with respect to the center axis 17 of the nozzle 9', but also on the speed of the issuing gas jets. A distance of about 20 to 80 mm, preferably 30 to 60 mm, is a general guide. A nozzle having a diameter of 7 mm and bore diameters of 1.5 mm has proved advantageous in practice.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a process for separating metallurgical products, such as ingots, slabs or plate-shaped workpieces, and in particular for transversely dividing the cast strand in continuous casting plants and for longitudinally dividing continuous cast ingots which have previously been cut into lengths, in which the metallurgical products are divided using at least one cutting torch which forms a cutting jet disposed on one side of the product and by following a prescribed cutting line and in which a front cutting edge is formed on the surface of the product facing said cutting torch and a rear cutting edge is formed on the opposite side of the product and a cutting joint is formed therebetween, the improvement comprising directing at least one gaseous jet at said rear cutting edge of said product, whereby a mixture of molten metal and liquid slag formed during cutting of said product is blown away from said rear cutting edge of said product thereby preventing the formation of flame burrs at the edges of said cutting joint.

2. The process recited in claim 1, wherein said step of directing comprises, directing at least one cold gaseous jet at said rear cutting edge of said product.

3. The process recited in claim 1, wherein said step of directing comprises, directing at least two gaseous jets which are symmetrically disposed with respect to said cutting joint at said rear cutting edge of said product.

4. The process recited in claim 1, wherein said step of directing comprises, directing said gaseous jet at areas of said rear cutting edge which pass into edges of said cutting joint.

5. The process recited in claim 1, wherein said step of directing comprises, directing said gaseous jet at said rear cutting edge along the direction of formation of said cutting joint.

6. The process recited in claim 1, wherein said step of directing comprises, directing said gaseous jet at said rear cutting edge of said product at an angle between about 0° and about ±30° with respect to the tangent plane of said product in the area of said rear cutting edge.

7. The process recited in claim 1, wherein said step of directing comprises, directing said gaseous jet at said rear cutting edge of said product at an angle between about 0° and about ±15° with respect to the tangent plane of said product in the area of said rear cutting edge.

8. The process recited in claim 1, wherein said gaseous jet comprises an air jet which is weaker than said cutting jet of said cutting torch.

9. The process recited in claim 1, wherein said gaseous jet comprises an oxygen jet which is weaker than said cutting jet of said cutting torch.

10. The process recited in claim 1, wherein the intensity and direction of said gaseous jet are adjustable independently of said cutting jet of said cutting torch.

11. The process recited in claim 10, wherein the intensity and direction of said gaseous jet are adjustable independently of said cutting jet and independently of each other.

12. The process recited in claim 1, wherein said cutting jet of said cutting torch is directed downwardly onto said product, and wherein said rear cutting edge comprises a lower cutting edge of said product.

13. In an apparatus for separating metallurgical products, such as ingots, slabs or plate-shaped workpieces, and in particular, for transversely dividing the cast strand in continuous casting plants and for longitudinally dividing continuous cast ingots which have previously been cut into lengths, said apparatus including at least one cutting torch which forms a cutting jet disposed on one side of the product for dividing the product by following a prescribed cutting line and which forms a front cutting edge on the surface of the product facing said cutting torch during cutting and a rear cutting edge on the opposite side of the product and a cutting joint therebetween, the improvement comprising at least one gas jet nozzle means, coupled to said cutting torch and directed at said rear cutting edge of said product, for blowing molten metal and liquid slag formed during cutting of said product away from said rear cutting edge of said product, thereby preventing the formation of flame burrs at the edges of said cutting joint.

14. The apparatus recited in claim 13, wherein a pair of gas jet nozzle means, disposed symmetrically with respect to said cutting joint, are coupled to said cutting torch and are directed at said rear cutting edge of said product.

15. The apparatus recited in claim 13, wherein said gas jet nozzle means is directed at said rear cutting edge at an angle of between about 0° and about ±30° with respect to the tangent plane of said product in the area of said rear cutting edge.

16. The apparatus recited in claim 13, wherein said gas jet nozzle means is directed at said rear cutting edge at an angle of between about 0° and about ±15° with respect to the tangent plane of said product in the area of said rear cutting edge.

17. The apparatus recited in claim 13, wherein said nozzle means comprises a multi-hole fan nozzle.

18. The apparatus recited in claim 13, wherein said nozzle means comprises a fan jet nozzle.

19. The apparatus recited in claim 13, wherein said nozzle means comprises a multi-hole nozzle.

20. The apparatus recited in claim 19, wherein said nozzle includes two groups of two parallel bores and the bore axes of each of said groups are disposed at an angle of between about 10° and about 20° with respect to the center axis of said nozzle, the bore axes of said groups being further disposed at an angle of between about 20° and about 40° with respect to each other, and the axes of said bores being disposed in the same plane.

21. The apparatus recited in claim 13, further comprising means for movably connecting said nozzle means to said cutting torch, said means being adapted to extend into said cutting joint.

22. The apparatus recited in claim 21, wherein said connecting means includes spacer means coupled to said cutting torch, and adjustment means, coupled to said spacer means and said connecting means, for permitting adjustment of the position of said nozzle means with respect to said cutting joint.

23. The apparatus recited in claim 21, further comprising means for cooling said connecting means.

* * * * *